July 18, 1961 H. VAN DER HORST 2,992,869
ENGINE PISTON
Filed April 15, 1957
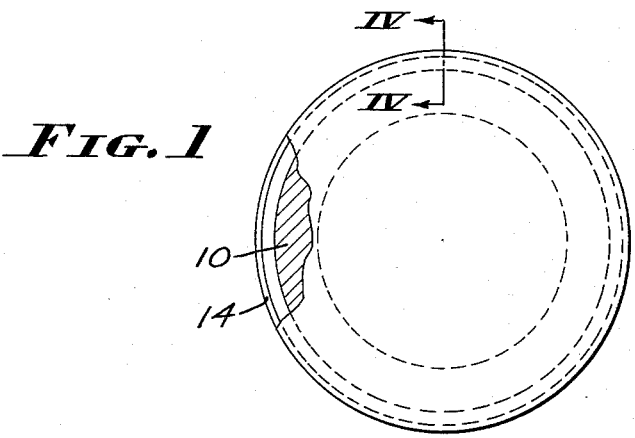
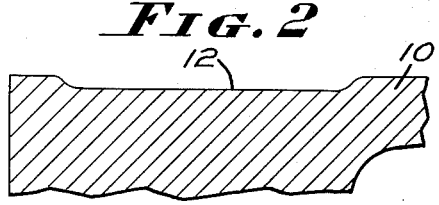
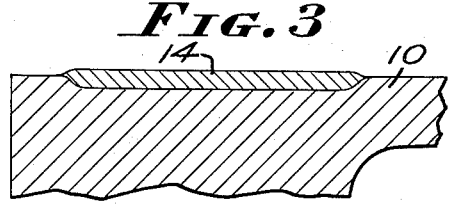
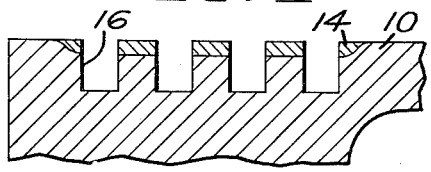
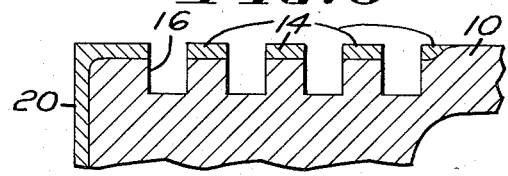
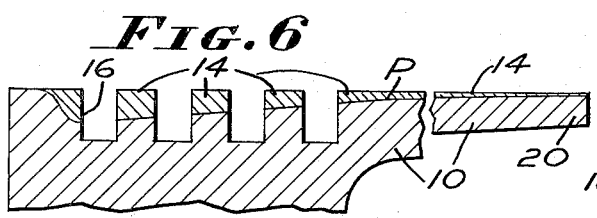
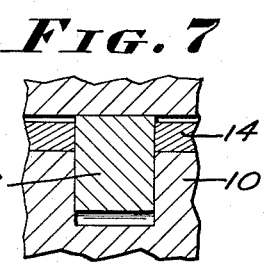
INVENTOR:
HENDERIK VAN DER HORST
BY:
Beau, Brooks, Buckley & Beau,
ATTORNEYS.

United States Patent Office 2,992,869
Patented July 18, 1961

2,992,869
ENGINE PISTON
Henderik van der Horst, Blaricum, Netherlands, assignor to Van der Horst Corporation of America, Olean, N.Y.
Filed Apr. 15, 1957, Ser. No. 652,717
3 Claims. (Cl. 309—14)

It is recognized that aluminum alloy pistons are desirable for reciprocating engines and compressors because of their light weight and superior heat conducting characteristics. On the other hand, such alloys have the disadvantage of being relatively soft at normal and operating temperatures. As a result, the piston ring battering against the top and bottom of the piston ring grooves tends to destroy the shape of and to widen the grooves. Also, friction forces between the ring and the cylinder wall tend to twist the ring section, and this friction loading is maximum at the outer circumference of the piston and tends to deform the ring grooves from their normal shape. This results in increased "blowby," loss of power, and increased oil consumption, and accelerates wear not only of the piston ring periphery but also of the cylinder wall.

A further disadvantage attending softening of the aluminum alloys at piston operating temperatures, is the tendency thereof to scuff and smear the cylinder walls. Still another disadvantage of an all-aluminum piston is that it possesses an inherent high rate of thermal expansion, making it necessary to initially provide relatively large "cold" dimensional clearances between the piston and the cylinder. This of course results in noisy operation and excessive piston rocking until the engine becomes hot, thereby contributing heavily to piston ring wear.

Still another disadvantage of light metal pistons, is that they are vulnerable at the crown portions thereof to high operating temperatures and to the impingement of burning fuel particles and hot gases thereagainst. For example, in high output engines extreme gas temperatures often cause pin-holing or small pit burning of the piston crown. Such burn holes become gradually bigger, and eventually the whole crown becomes burnt and in extreme cases the light metal sometimes melts at the crown edge and scuffs onto the outside diameter of the piston. Hence, it has been previously suggested to provide heat resistant metal inlays at the piston crown surface to buffer the latter against these deleterious effects of high temperatures. However, such processes are relatively expensive and otherwise troublesome.

Prior schemes for minimizing light metal piston ring groove distortion include casting-in a ring carrier of ferrous metal as shown in French Patent 1,027,508 for example; or casting-in other forms of individual segments of wear-resistant metal at the ring groove locations. Such methods interpose heat dams at the junctions of the aluminum metal and the metal inserts, because they do not provide continuous virgin metal junctions and hence heat flow from the piston to the rings and thence to the cylinder walls is reduced.

The purpose of this invention is to provide a novel means for strengthening the piston ring grooves in light metal pistons, and at the same time restraining the light metal piston against expansion, and coincidentally to provide the running faces of the piston with an electrolytic deposit of a harder metal such as iron which is less likely to soften at operating temperatures, being thereby less likely to pick up abrasives and scuff the cylinder walls.

Incidental to obtaining the objects of the invention as aforesaid, the crown portion of the piston may be simultaneously beneficially treated to protect it against the excessive temperature effects hereinabove referred to.

In the drawings:
FIG. 1 is a top plan view of an engine piston, with a portion broken away to show the piston ring groove formation;
FIG. 2 is a fragmentary longitudinal sectional view through a side wall portion of the piston blank, at the first step of the method of manufacture thereof;
FIG. 3 is a view corresponding to FIG. 2, but showing the second step of manufacture thereof;
FIG. 4 is a view corresponding to FIGS. 2, 3, but showing the final construction thereof, representing on an enlarged scale a sectional view taken along line IV—IV of FIG. 1;
FIG. 5 is a view corresponding to FIG. 4, but of a modified form of piston construction;
FIG. 6 is another view corresponding to FIGS. 4, 5, but of still another form of piston construction of the invention; and
FIG. 7 is a fragmentary sectional view through a piston, piston ring, and cylindrical assembly, illustrating the operative relationship of those parts.

In one form the invention consists of electroforming a plurality of cylindrical expansion-resistant girdles around the outside of the piston, at selected stations in the area where the grooves of the piston rings are normally located. For example, as shown in the drawing herewith, a piston may be fabricated in accord with the present invention by first casting the piston 10 or machining the piston casting so as to be formed at the ring belt area to include a broad valley 12 (FIG. 2) to allow for the desired thickness of electro-formed metal 14 (FIG. 3). This thickness will vary with the piston diameter and the piston ring depth but in practice may be at least 15% of the ring depth. In any case the electro-formed material is applied in excess (FIG. 3) to allow for final machining down to the prescribed outside diameter of the piston. The preferred metal for the electro-formed mass 14 is iron and it is desirable that the finished thickness of the electro-formed iron be less than the depth of the ring groove in order to utilize as much of the aluminum alloy ring groove faces for heat transfer to the ring as possible. This is feasible because ring groove wear and shape change forces are maximum at the outside diameter of the piston.

As illustrated in FIG. 4, the piston blank of FIG. 3 is now machined down to the prescribed outside dimensions and to include piston ring receiving grooves 16. Thus, each piston groove will be margined by an outer band of electroformed iron 14; the inner portions of the grooves being defined by the light metal of the piston body 10. Thus, as explained hereinabove the piston rings 18 (FIG. 7) when mounted within the grooves 16 are in good heat exchange contact relation with the wall portions formed of light metal, while the outer edges of the grooved portions of the piston are all formed of iron, being thereby resistant to ring battering as explained hereinabove. At the same time the cylindrical iron band portions 14 (FIG. 4) function to effectively restrain the light metal piston body 10 against thermal diametrical expansion under operating conditions. Hence the completed piston assembly may be initially diametered relatively close to the inside diameter of the cylinder when cold, thereby avoiding the difficulties hereinabove mentioned. Also, the iron bands 14 provide piston running faces of improved bearing characteristics.

Thus, it will be appreciated that by virtue of the present invention a piston of improved structural stability and operating characteristics may be readily fabricated by relatively simple and inexpensive manufacturing techniques. As shown in FIG. 6 the bands of iron 14 may be provided to successively shallower depths, from the crown of the piston toward the skirt thereof; so as to provide varying degrees of constraint against diametrical expansion of the piston at different stations longitudinally thereof commensurate with the varying temperatures to which various portions of the piston are heated under operating conditions.

In another form of practice of the invention incidental to electroforming the iron band or bands in the piston ring area, iron is simultaneously electroformed to enclose the crown portion of the piston as indicated at 20 (FIG. 5). This portion of the electroform is subsequently machined so as to bring the finished piston down to the described dimensions; and thus it will be appreciated that the crown portion of the piston is thereby armored against the excess heat forces hereinabove referred to. Similarly, it will of course be appreciated that in some cases it may be preferred to provide the finished piston with an electroformed coating of iron throughout the skirt portion of the piston also to improve its bearing characteristics; and it will of course be understood that this may be readily provided simply by suitable dimensioning of the light metal piston core and electroforming the iron in the desired areas thereon, as is well understood in the electroforming art.

For example, the electroformed iron 14 may preferably be provided to relatively substantial depth throughout the piston ring groove region in order to provide the optimum protection for the corners of the ring grooves as explained hereinabove, while at the same time providing the electroformed iron to decreasingly lesser depth toward the skirt end portion of the piston. Thus, as shown in FIG. 6 the electroformed iron 14 in the region of the ring grooves 16 will be of maximum thickness at the crown end portion of the piston and of relatively rapidly decreasing thickness therefrom toward a point such as indicated at P at the base of the ring groove area. Then from point P the electroformed iron section would extend without interruption but at relatively lesser and still constantly decreasing sectional thickness throughout the remainder of the longitudinal extent of the piston; terminating in a shell of minimum sectional thickness at the bottom edge of the skirt portion 20 of the piston.

In the case of each piston design the thickness of the electroformed iron casing will preferably be varied throughout the longitudinal extent of the piston commensurate with factors such as operating temperatures and temperature differentials at different ends of the piston; heat transfer characteristics of the electroformed iron and aluminum alloy used; thermal expansion coefficients of the metals used; and the like. In any case in accord with this feature of the invention the relatively high temperature ring groove portion of the piston will be more heavily armored and the skirt portion of the piston will be less heavily armored and decreasingly so toward the relatively cold end of the piston, commensurate with the variables hereinabove mentioned. Thus, the entire side wall structure of the piston will be continuously reinforced against wear and battering and expansion through use of minimum addition of relatively heavy weight iron metal to the structure. A suitable process for electroforming the iron upon the light metal piston core is disclosed for example in our prior U.S. Patent No. 2,745,800.

I claim:

1. An engine piston comprising a light metal core having electroformed iron encasing the side wall thereof, said piston including a piston ring groove portion and a skirt portion, said electroformed iron casing being of relatively thick section throughout said ring groove portion and of thinner section throughout said skirt portion, said piston being annularly grooved at the ring groove portion thereof inwardly from the outer surface of said electroformed iron casing entirely through said casing and into the light metal material therebehind, and a piston ring disposed within said groove in heat exchange contact relation with the light metal of said piston and with said electroformed iron.

2. An engine piston including a crown portion and a skirt portion, said piston comprising a light metal core having electroformed iron encasing the side wall thereof, said piston having a plurality of annular grooves formed in the outer surface thereof adjacent said crown portion, each of said grooves extending inwardly from the outer surface of said electroformed iron casing entirely through said casing and into the light metal material therebehind, said grooves defining annular bands of iron therebetween, said bands of iron being of successively shallower depths from the crown portion of the piston toward the skirt portion thereof to provide varying degrees of constraint against diametrical expansion of the piston at different stations longitudinally thereof commensurate with the varying temperatures to which various portions of the piston are heated under operating conditions, and a piston ring disposed within each of said grooves and being in heat exchange contacting relation with the light metal of the piston and with said electroformed iron.

3. An engine piston including a crown portion and a skirt portion, said piston comprising a light metal core having electroformed iron encasing the outer side wall surface thereof, said piston having an annular groove formed in the outer side wall surface thereof adjacent said crown portion, said groove extending inwardly from the outer surface of said electroformed iron casing entirely through said casing and into the light metal material therebehind, said groove defining annular bands of iron at opposite sides thereof of successively shallower depths from the crown portion of the piston toward the skirt portion thereof to provide varying degrees of constraint against diametrical expansion of the piston at different stations longitudinally thereof commensurate with the varying temperatures to which various portions of the piston are heated under operating conditions, and a piston ring disposed within said groove and being in heat exchange contacting relation with the light metal of the piston and with said electroformed iron.

References Cited in the file of this patent

UNITED STATES PATENTS

| 1,717,750 | Wills | June 18, 1929 |
| 1,856,272 | Summers | May 3, 1932 |
| 1,947,493 | Rose et al. | Feb. 20, 1934 |
| 2,036,740 | Bengston | Apr. 7, 1936 |
| 2,124,360 | Welty | July 19, 1938 |
| 2,403,455 | Phillips | July 9, 1946 |
| 2,410,405 | Cornelius | Nov. 5, 1946 |
| 2,833,264 | Dailey et al. | May 6, 1958 |

FOREIGN PATENTS

| 642,042 | Great Britain | Aug. 23, 1950 |
| 763,773 | Germany | June 8, 1953 |

OTHER REFERENCES

German Application Ser. No. J2520-Ia/46[1], printed June 14, 1956 (Kl. 46c[1] Gr. 9).